UNITED STATES PATENT OFFICE.

JACOB FRIEDMAN, OF CHICAGO, ILLINOIS.

SOY-BEAN PRODUCTS AND METHOD OF PREPARATION.

1,194,495. Specification of Letters Patent. Patented Aug. 15, 1916.

No Drawing. Application filed December 17, 1914. Serial No. 877,734.

*To all whom it may concern:*

Be it known that I, JACOB FRIEDMAN, citizen of the United States, residing at Chicago, State of Illinois, have invented certain new and useful Improvements in Soy-Bean Products and Methods of Preparation, of which the following is a specification.

The invention relates to improvements in or connected with a new or improved food preparation.

As is well known the soy bean is very rich in nitrogen and is otherwise valuable as an article of food, but by reason of its unpleasant flavor and odor, generally considered inseparable from the bean, it has been very little used as a food for man except in the Far East, where the flavor is not so important, although it is largely used in this country as a cattle food after the extraction of the oil. Many attempts have been made to remove the unpleasant flavor and odor of the bean without detracting from the value of its food constituents, such as by baking or roasting it in a whole state and thereby more or less driving off the unpleasant flavor in question, but those processes have proved insufficient to render the bean generally acceptable as an article of food.

Now I have discovered, that by first reducing the bean, before baking or roasting, to a state of flour, and then driving off its contained moisture by heating it in a manner to be later described, it parts with the unpleasant flavor without losing any of its valuable constituents which go to make it a nourishing food.

In carrying the present invention into effect, the beans, in their natural state, are first passed through a bean cleaning, picking and sorting machine in order to remove all dust, dirt and other impurities, adhering thereto. After this, the beans are passed through a breaking, decorticating or winnowing machine whereby the shells or husks are broken and divided from the beans and received into a separate chamber provided for that purpose, the beans being delivered separately from the husks. The beans thus cleaned and shelled are then passed through any suitable mill or grinding or disintegrating machine adapted to reduce them to a fine flour, the degree of fineness to which they are reduced being dependent upon the food product to which they are to be applied, namely, whether it be for bread, biscuits, soup, sweetmeats or confectionery such as chocolate, caramels, toffee, cream fondants, pastes and the like. The flour thus produced from the natural bean contains, for example, from 11.10% to 13.04% of moisture, and this moisture is then driven off by any suitable application of heat carrying with it the unpleasant flavor of the soy bean leaving a palatable food suitable for human consumption.

The necessary heating should be accomplished in a steam autoclave having a suitable outlet or in a steam jacketed pan, closed, if desired, with the exception of a small opening. During this operation the flour is continuously stirred or agitated by any suitable stirring or agitating device.

The temperature to which the flour is subjected necessarily varies according to the color to be given to the product which is naturally dependent on the purpose for which it is to be used and it may range from 120 degrees to 300 degrees centigrade more or less, but preferably the temperature should be approximately 155 degrees C. with a pressure of 14 atmospheres within the cooking vessel. But for the preparation of a flour suitable for bread, for example, the temperature may conveniently be 155 degrees centigrade, and the period of the operation from seventy minutes to an hour and a half, the stirring of the material being effected by hand or otherwise during said operation.

During the heating and stirring process above described, the unpleasant flavor and odor are entirely driven off from the flour leaving it with a sweet and wholesome taste ready for use in the production of various articles of food.

Naturally after the above treatment the flour will again take up a certain proportion of moisture from the atmosphere but this in no way detracts from its use, palatability or marketable value.

The manner in which the finely comminuted or divided flour is heated and the degree to which it is heated is extremely important. The roasting or other heating of the soy beans will have practically no effect and the beans must be in a finely divided condition before they are heated in order to secure such an application of heat thereto as will completely drive off or carry away the unpleasant flavor and odor. Furthermore, these beans must be treated in an autoclave or like utensil in order to secure a relatively high degree of heat without the burning of the beans. If the beans are merely roasted the unpleasant flavor and odor is either not driven off in consequence of the roasting being too light, or else if the temperature is high enough to cause the driving off of the unpleasant flavor and odor, then the beans either in their whole condition or in their comminuted condition are burned and their food value is either entirely or greatly ruined. Furthermore, in an autoclave the soy beans may be submitted simultaneously to heat and pressure and over a relatively protracted period without any danger of burning the beans. Thus the object desired is secured. By my method I provide an article of food in the form of flour which is extremely nutritious, which has absolutely no prejudicial effect, and which has none of the disagreeable taste, odor or effect of the soy bean itself.

Having now particularly described and ascertained the nature of the said invention and in what manner the same is to be performed, I declare that what I claim is:—

1. A method of treating soy beans to produce an article of food, consisting in reducing the beans in a raw state to a relatively fine state of division and then submitting the finely divided material in an autoclave to the action of heat and pressure at a temperature of 120 degrees to 300 degrees centigrade.

2. A method of treating soy beans to produce an article of food, consisting in reducing the beans in a raw state to a finely divided condition, submitting the finely divided material to the action of heat and pressure at a temperature of 120 degrees to 300 degrees centigrade and agitating the material during such submission.

3. A method of treating soy beans to produce an article of food consisting in reducing the beans to a finely divided condition, submitting the finely divided material in an autoclave to a temperature of 120 degrees to 300 degrees centigrade and agitating the material during said submission.

4. A method of treating soy beans to produce an article of food consisting in reducing them to a finely divided condition and submitting the finely divided material to the action of heat at a temperature of approximately 155 degrees centigrade without burning the beans and during a relatively protracted period.

5. The herein described food preparation consisting of soy beans reduced to a finely divided condition and then submitted to the action of heat at a temperature of 120 degrees to 300 degrees centigrade for a relatively protracted period.

Dated this 17th day of December, 1914.

JACOB FRIEDMAN.

Witnesses:
A. N. ROBERTS,
LEE MOCKBEE.